United States Patent [19]
Nakano et al.

[11] Patent Number: 5,463,511
[45] Date of Patent: Oct. 31, 1995

[54] SPINDLE UNIT HAVING PRE-LOAD MECHANISM

[75] Inventors: Masaaki Nakano, Hitachi; Tomoaki Inoue, Mito; Hideaki Amano, Odawara; Akio Takatsuka, Hiratsuka; Osamu Beppu, Odawara; Kenji Mori, Tsuchiura; Takashi Yoshida; Takashi Kohno, both of Ibaraki, all of Japan

[73] Assignee: Hitachi, Ltd., Tokyo, Japan

[21] Appl. No.: 123,354

[22] Filed: Sep. 17, 1993

[30] Foreign Application Priority Data

Sep. 17, 1992 [JP] Japan ................. 4-247573
Dec. 16, 1992 [JP] Japan ................. 4-335666
Jun. 22, 1993 [JP] Japan ................. 5-150106

[51] Int. Cl.⁶ ........................................ G11B 19/20
[52] U.S. Cl. ........................ 360/99.08; 360/99.04; 360/98.07
[58] Field of Search ................. 360/98.07, 99.04, 360/99.08; 310/67 R

[56] References Cited

U.S. PATENT DOCUMENTS

| | | | |
|---|---|---|---|
| 4,630,943 | 12/1986 | Stahl et al. ................. | 384/133 |
| 5,012,359 | 8/1991 | Kohno et al. ............... | 360/98.07 |
| 5,051,853 | 9/1991 | Hosoya ...................... | 360/98.07 |
| 5,091,809 | 2/1992 | Conners et al. ............. | 360/99.08 |

FOREIGN PATENT DOCUMENTS

| | | |
|---|---|---|
| 60-5467 | 1/1985 | Japan . |
| 60-175870 | 9/1985 | Japan . |
| 60-249727 | 12/1985 | Japan . |
| 60-245878 | 12/1985 | Japan . |
| 61-151877 | 7/1986 | Japan . |
| 63-130958 U | 8/1988 | Japan . |
| 64-725 U | 1/1989 | Japan . |
| 64-79420 | 3/1989 | Japan . |
| 2-180312 | 7/1990 | Japan . |
| 4-12 | 1/1992 | Japan . |

Primary Examiner—Stuart S. Levy
Assistant Examiner—William R. Korzuch
Attorney, Agent, or Firm—Antonelli, Terry, Stout & Kraus

[57] ABSTRACT

A rotor magnet is attached to the inner peripheral portion of a hub to attach a magnetic disk or the like and a stator is provided in the outer peripheral portion of a bearing housing so as to face the rotor magnet, thereby forming a rotating mechanism. A magnetic pre-load mechanism is provided and a spindle is pressed to one side of a radial bearing, thereby stabilizing the rotation.

4 Claims, 9 Drawing Sheets $t1 > t2$ $t3 > t4$ $t_5 > t_6$

SPINDLE UNIT HAVING PRE-LOAD MECHANISM

BACKGROUND OF THE INVENTION

1. Field of the Invention

The present invention relates to a spindle unit of an apparatus with a rotating unit such as, for example, a magnetic disk apparatus, an optical disk apparatus and a laser beam printer and, more particularly, to a spindle unit adapted to stably be driven for rotation and preventing contamination of a disc.

2. Description of the Related Art

With the down sizing or miniaturization of computers, the down sizing of a magnetic disk apparatus as an external memory device is also required. On the other hand, demands for a large capacity and a high processing speed also continuously exist. To satisfy those demands, a magnetic disk apparatus of a small size and a large capacity has been realized by increasing a recording density. For this purpose, it is necessary to accomplish a high performance and a small size of a spindle unit rotating at a constant speed.

In the conventional spindle unit, a ball bearing is used for a supporting mechanism of the spindle. By increasing working precisions of the ball bearings and inner and outer wheels, an irregular rotational fluctuation due to the ball passage vibration that is peculiar to the ball bearing is reduced, resulting in an improved rotating precision. However, since an adequate precision cannot be achieved only through the improvement of the working precisions as mentioned above, the use of the sliding bearing is considered. In the sliding bearing, it is necessary to mechanically apply pre-loads in the radial and thrust directions to position the spindle and thereby to improve the rotating precision.

In for example, JP-A-61-151877, a technique is proposed wherein, in order to apply the pre-loads, ball bearings are provided in the upper and lower portions of the spindle, with the outer wheel of the upper bearing being fixed to the bearing housing at the upper portion and the outer wheel of the bearing at the lower portion being preloaded in the thrust direction by a spring member. The and outer wheel of the lower ball bearing is guided in a concave portion of the bearing housing by an attracting force in the radial direction of the spindle by a pad-like permanent magnet provided between the two ball bearings in close vicinity to the spindle, resulting in stable rotation of the spindle. However, a micro vibration due to a rolling contact between the outer wheel surface and the balls or the inner wheel surface and the balls of the ball bearing cannot be prevented. In addition, since a motor section for driving the spindle is provided on the lower side of a magnetic disk enclosing section so as to be projected therefrom, there is a problem that the apparatus is long in the axial direction and increases in size.

JP-A-60-5467 discloses a technique to suppress the vibration by a magnetic attracting force between a concentrical magnetic material provided in a part of the main shaft system and a permanent magnet provided on the fixed side so as to face the magnetic material. According to such a technique, however, there is a problem that, although the vibration in the axial direction can be suppressed, a vibration suppressing effect in the radial direction is insufficient. There is also a problem that, the shape is large because a magnetic force operating section, a pulley (rotation driving section), and the like are projected to the lower side.

JP-A-2-180312 proposes a technique wherein, in order to reduce the vibration by setting the center of gravity of a rotating body to a low position, the rotating body which is heavier than the rotor of the motor is attached to a position lower than the position of the rotor, and further the rotating body is lifted up in the axial direction by a magnetic force between a ferromagnetic material provided for the rotating body and a magnet attached to the housing side, thereby reducing a load of shaft. There is, however, a problem that the rotating body is projected to the lower portion of the spindle unit thereby increasing the overall size and increasing the weight of the rotating body.

JP-U-63-130958 proposes a technique wherein an eccentric member in the form of a permanent magnet provided between the bearings fixed to a bearing housing, is fitted into a supporting hole formed in a side wall portion of the bearing housing locating on an extension line in the seeking direction of a head, and an adjustment screw is further provided for a supporting hole, thereby adjusting the position between the spindle and the eccentric member. Therefore, the spindle is attracted to the eccentric member such that it contacts and is supported by the inner surface of the bearing. The eccentric position of the spindle corresponds to the seeking direction of the head, and the spindle moves along an elliptical orbit with the minor axis in the eccentric direction. Therefore, a non-rotating period oscillation decreases and a tracking error upon reproduction is decreased. However, a space to adjust the position of the eccentric member is necessary. Since the eccentric member is provided on the side wall portion of the bearing housing with a sealed lubricating agent, there exists the possibility of lubricant leakage from its opening portion.

JP-A-4-12 proposes a technique wherein a magnet, magnetized in the vertical direction over a range of 180°, is arranged between the bearings for rotatably supporting the shaft member formed of a magnetic material and the shaft member is brought into line contact with one side of the bearing member by an attracting force of the magnet, thereby stabilizing the rotating motion. However, since no magnetic circuit is formed on the side having no magnet, the lubricating oil cannot be prevented from scattering to the outside from the sliding surface of the bearing due to a centrifugal force during the rotation of the shaft. There is, consequently, a problem that a lack of oil occurs on the sliding surface and the bearing is burnt and damaged in a short period of time.

Generally, in a rotating apparatus such as magnetic disk apparatus, optical disk apparatus, or magnetooptic disk apparatus which is extremely sensitive to a contamination of the disk, a sealing device to prevent the scattering of the lubricating oil for the bearing is provided at an edge surface of the bearing. In many instances, a magnetic fluid seal is used in the sealing method. When the spindle is rotated at a high speed, the magnetic fluid (lubricating oil) is often scattered due to the centrifugal force in association with an increase in rotational speed. The reliability of the magnetic fluid sealing device itself causes a problem. As disclosed in JP-A-60-175870 and JP-A-60-245878, conventional magnetic fluid sealing devices, pole pieces of multistages are provided for a shaft, a permanent magnet and a magnetic pole member are arranged on the stationary side, and a magnetic circuit is constructed by a ball bearing and a magnetic pole member, thereby providing a compact sealing device. As disclosed in JP-A-60-249727, JP-A-64-79420, JP-U-64-725, and JP-U-1-87330, there is also a sealing device which is constructed by arranging a magnet and a pole piece to the outer wheel or inner wheel of a ball bearing. Further, as disclosed in U.S. Pat. No. 4,630,943, a magnet and a pole piece are provided on the stationary side on the inner peripheral side than the bearing diameter, thereby improving the sealing function. Further, as disclosed in JP-U-63-42928, a structure is proposed wherein a projecting portion is provided on the shaft side and a magnet and a pole piece are arranged on the stationary side, thereby making it difficult for the magnetic fluid to be scattered by the centrifugal force. On the other hand, as disclosed in JP-U-64-54748, there is also a structure such that a cover to prevent the scattering of the magnetic fluid is attached to the outer peripheral portion of the pole piece.

However, for example, according to the techniques disclosed in JP-A-60-175870 and JP-A-60-245878, where the magnetic fluid is scattered during the rotation at a high speed, the magnetic fluid is attracted to the magnet and it is difficult to collect the magnetic fluid at the pole piece. On the other hand, according to the techniques disclosed in JP-A-60-249727, JP-U-64-79420, JP-U-64-725, and JU-A-1-87330, no consideration is made with respect to the scattering of the magnetic fluid. In the technique disclosed in JP-U-64- 54748, although a cover is provided for the preventing scattering of the magnetic fluid, the magnetic fluid collected to the cover is merely held on the side surface of the pole piece and is hardly collected into a seal gap portion at the tip of the pole piece. Even in case of the structure such that the magnetic fluid is hardly scattered due to the centrifugal force as shown in the technique disclosed in JP-U-63- 42928, since a magnetic flux density at the position where the magnetic fluid is held is low, a seal withstanding pressure is low and no consideration is made for the scattering in the axial direction.

SUMMARY OF THE INVENTION

It is an object of the present invention to provide a spindle unit which avoids the above problems encountered in the prior art and which enables a miniaturization the spindle unit and improvement in a rotating precision.

Another object of the invention is to provide a spindle unit having a structure which minimize, if not avoids a scattering of a magnetic fluid by the centrifugal force in the high-speed rotation, with a sealing device being provided which can collect any scattered magnetic fluid, thereby preventing a contamination of a disk.

To accomplish the above objects, in a spindle unit, a rotor magnet is attached to an inner peripheral portion of a hub to attach magnetic disks or the like and a stator is attached to an outer peripheral portion of a bearing housing so as to face the rotor magnet to thereby form a motor, with a pre-load mechanism being provided and with a spindle being pressed toward one side of a radial sliding bearing, thereby stablizing rotation of the spindle unit. With ring-shaped permanent magnets in the pre-load mechanism, a gap between the permanent magnets is set to be greater than that between the spindle and radial bearing in the bearing housing. The two ring-shaped permanent magnets are deviated in the spindle axial direction, thereby optimizing a thrust bearing pressure.

By providing a sealing mechanism for the spindle unit, the lubricating oil around the spindle shaft is sealed.

The pre-load mechanism may also included a ring-shaped permanent magnet provided between the radial bearings. The ring-shaped magnet is provided so as to be eccentric in the radial direction for the spindle shaft and the spindle is pressed toward one side of the radial bearing, thereby stabilizing the rotation of the spindle unit. It is also possible to divide the ring-shaped permanent magnet into two magnets and to form the half rings into shapes having differing inner diameters.

The ring-shaped permanent magnet may be magnetized in the axial direction, with the radial bearing and spindle being made of a magnetic material and the bearing housing being made a non-magnetic material. With such a construction, the pre-load mechanism and the sealing mechanism can be commonly used. When a cover having a chamber is provided for an opening end portion of the radial bearing, an oil repellent having an extremely small surface tension is coated to one or both of the outer surface of the cover and the hub edge surface which faces it or to a part of the spindle. With such a construction, the sealing effect is enhanced.

Since the lubricating oil is pressed to the contact surface side of the spindle and the radial shaft by the pre-load mechanism as mentioned above, an oil film is always stably formed on the contact surface and the reliability between the shaft and the bearing can be improved. When the pre-load is generated by the magnetic force of the motor itself, the thrust direction pre-load mechanism of the pre-load mechanism can be omitted and the rotating precision is improved. Since the bearing loss is reduced, a temperature increase can be reduced. Further, since an activating torque is reduced, a capacity of the motor can be decreased. Thus, it is possible to eliminate the problems in the conventional magnetic disk apparatus, such that, since the spindle rotates at a small eccentric ratio due to a light load and a high-speed rotation, a rigidity of oil film of the bearing decreases, so that the apparatus is easily influenced by a disturbance and the vibration also increases.

DESCRIPTION OF THE PREFERRED EMBODIMENTS

A spindle unit according to the present invention will now be described in detail hereinbelow with reference to the accompanying drawings, taking a magnetic disk apparatus as an example.

Figure 7:
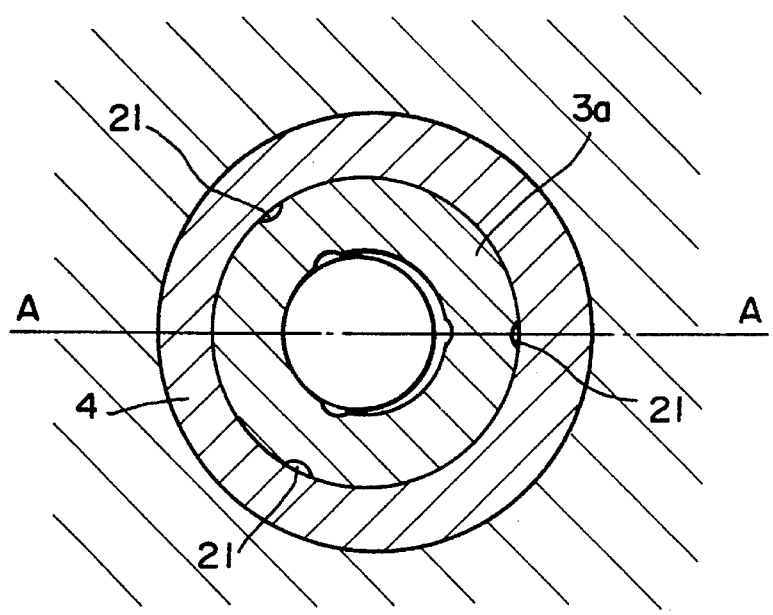
FIG. 7 is a cross sectional view of a spindle unit in FIG. 1.

FIG. 7 shows a three-arc sliding bearing 3a which is used in the invention. In FIG. 7, three communicating paths 21 for a magnetic fluid are shown in an outer portion of the bearing. With the bearing 3a also having three paths in an inner portion.

The spindle unit according to the invention has a rotating mechanism, a pre-load mechanism (radial preload mechanism and thrust pre-load mechanism), and a sealing mechanism.

Figure 1:
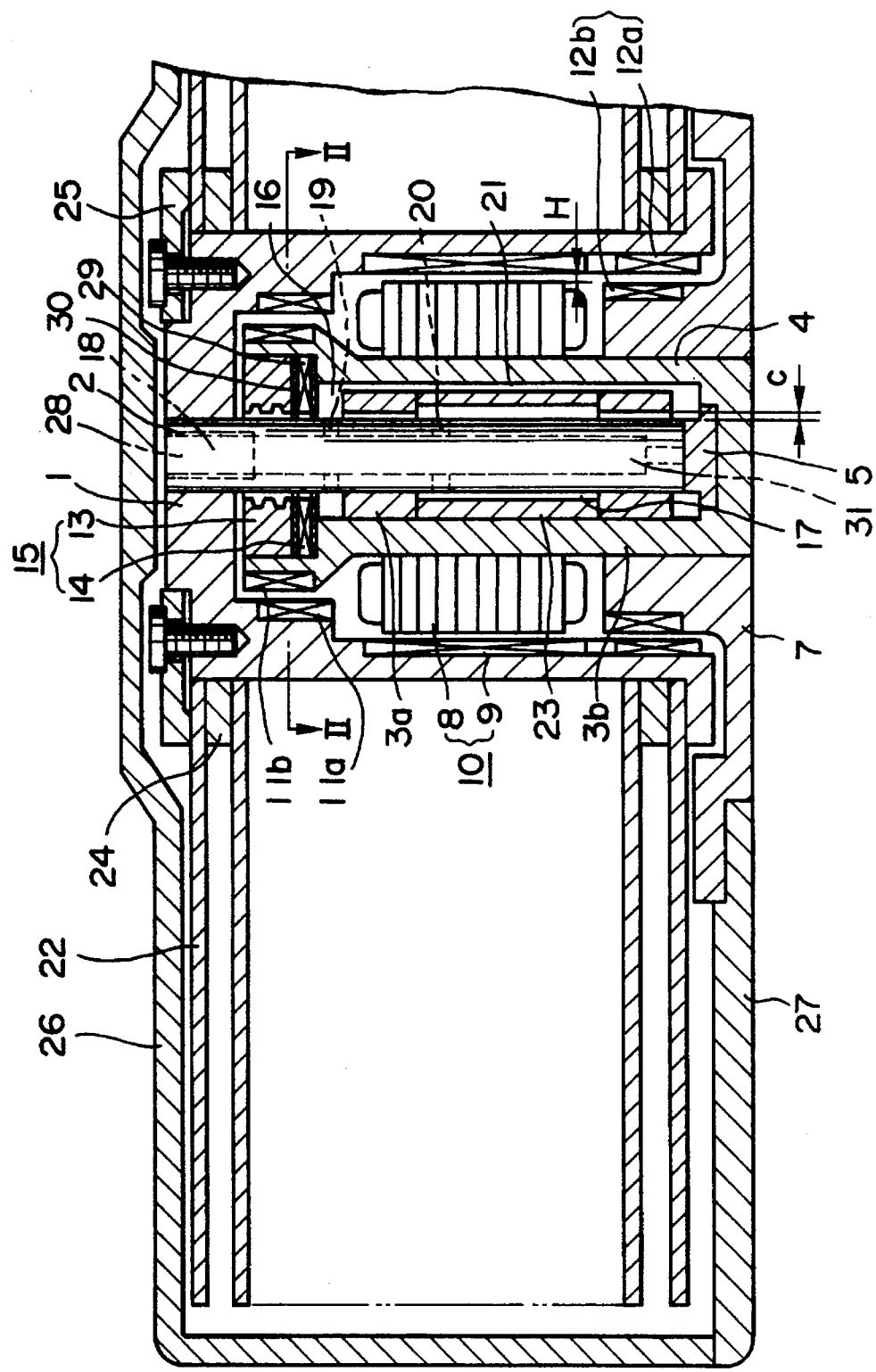
FIG. 1 is a vertical sectional view of an embodiment of a magnetic disk apparatus to which a spindle unit according to the invention is applied.

In FIG. 1, a plurality of magnetic disks 22 are coupled to each other through a spacer ring 24 and are attached to a hub 1 by a clamp 25. A spindle 2 is fixedly fitted into the hub 1, so that the hub is supported by a bearing housing 4. A lower edge portion of the bearing housing 4 is fixed to a base plate 7 so as to form a flat bottom surface. A stator 8 (armature coil), formed by winding a wire around an iron core, is attached to the outer central portion of the bearing housing 4. A rotor magnet 9 is fixed to the opposite inner surface portion of the hub 1. A motor 10 functioning as a rotating mechanism, is constructed by the rotor magnet 9 and the stator 8 and rotates the spindle 2. The spindle 2 is supported in the bearing housing 4 by a thrust sliding bearing 5 fixed to the inner bottom of the bearing housing 4 and radial sliding bearings 3a and 3b. A contactless sealing mechanism 15, including a screw sealing 13 and magnetic fluid seal 14 of a ring shape, is provided in the upper edge portion of the housing 4. An inner diameter of the sealing mechanism 15 is greater than a diameter of each of the radial bearings 3a and 3b. A cavity 16 is formed between the sealing mechanism 15 and the radial bearing 3a. A magnetic fluid, for example, lubricating oil with magnetic powder mixed 31 is sealed in the bearing housing 4. A closed casing is formed by a lower cover 27 to which the base plate 7 is fixed and an upper cover 26.

According to the invention, a radial pre-load mechanism that is provided which includes two pairs of ring permanent magnets in the inner surface portion of the hub 1 and the outer surface portions of the bearing housing 4 and base plate 7, with one of the permanent magnets of each pair of ring permanent being disposed concentrically with the spindle and the other of the pair of ring permanent magnets being disposed eccentrically with respect to the spindle. As a result, the spindle 2 is pressed into the radial direction by a magnetic repulsive force between the magnets of each pair, resulting in stable rotation of the spindle 2.

Figure 2:
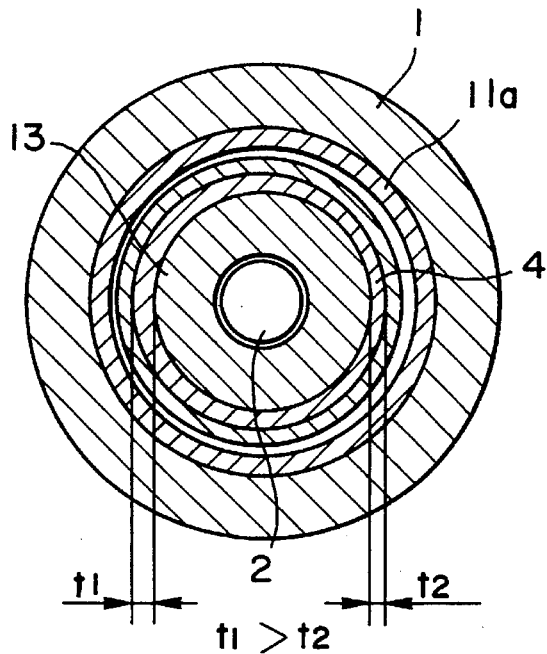
FIG. 2 is a cross sectional view taken along line II—II in FIG. 1.

For this purpose, as shown in FIG. 2, in the radial direction, magnets 11a and 12a have an uniform thickness so as to cause a uniform magnetic force, with the magnets 11a, 12a being without an eccentricity with respect to a center axis of of the spindle 2. Permanent magnets 11b and 12b are fitted to the bearing housing 4 and the lower base plate 7 to be eccentric with respect to the center of the housing 4. An eccentricity amount is equal to $(t_1-t_2)$ as shown in FIG. 2, with $t_1$ and $t_2$ representing worked widths of the bearing housing 4 to which the permanent magnet 11b is fitted. The spindle 2 is pressed toward predetermined portions of the inner peripheral surfaces of the radial bearings 3a and 3b by magnetic force due to the eccentric arrangement of the permanent magnets 11a and 11b, and 12a and 12b. It is desirable that the pressing direction coincides with the seeking direction of the magnetic head.

In the thrust direction, the magnets 11a and 12a are fixed to the upper and lower portion on the inner surface of the hub 1 apart from the rotor magnet 9. The permanent magnets 11b and 12b are fixed with predetermined gaps to the outer surfaces of the bearing housing 4 and base plate 7 opposing to the magnets 11a and 12a. The magnets 11a and 12a are provided at positions which are slightly lower than the magnets 11b and 12b, respectively, so that the spindle 2 is pre-loaded to the thrust sliding bearing 5 in the thrust direction. As mentioned above, the pair of magnets 11a and 11b and 12a and 12b construct the pre-load mechanism.

An axial direction flow path 18 is formed inside the spindle 2. An upper end portion of the flow path 18 is sealed by a cap 28 and a lower end portion thereof extends to the thrust bearing 5. Radial direction flow paths 19 and 20 are provided. The axial direction flow path 18 is connected with the cavity 16 and on oil chamber 17 through the radial direction flow paths 19 and 20, respectively. The connecting paths 21 are formed in the outer surface portions of the radial bearings 3a and 3b and an interbearing spacer 23. The magnetic fluid (lubricating oil including magnetic micropowder), injected from the upper end of the axial direction flow path 18, is supplied into the oil chamber 17 through the opening portion of the bottom of the spindle and the flow paths 19 and 20. Thereafter, the axial direction flow path 18 is sealed by the closing cap 28.

The sealing mechanism 15 is constructed by the screw seal 13 and the magnetic fluid seal 14. The magnetic fluid seal 14 is constructed by a ring-shaped permanent magnet 29 having magnetic pole pieces 30 on both sides. Even when the spindle 2 is eccentric, the inner surface of the magnetic fluid seal 14 merely approaches the outer surface of the spindle 2 in a contactless manner.

In the above construction, when the spindle 2 of the hub 1 to which the magnetic disks 22 are attached is inserted into the holes of the radial bearings 3a and 3b, since there are gaps of a few microns between the spindle 2 and each of the radial bearings 3a and 3b, the spindle 2 is pressed toward the inner surface of the radial bearings 3a and 3b in a direction due to magnetic force W by the pre-load mechanisms 11 and 12, so that a gap c is formed on the opposite side. No problem occurs because there is a gap of about 100 μm between the magnets 11b and 11a. In the stationary state, the spindle 2 is in contact with the radial bearings 3a and 3b and the thrust bearing 5. At the same time of the activation of the spindle 2, oil films of the lubricating oil (magnetic fluid) are formed between the spindle 2 and bearings 3a and 3b.

Figure 18:
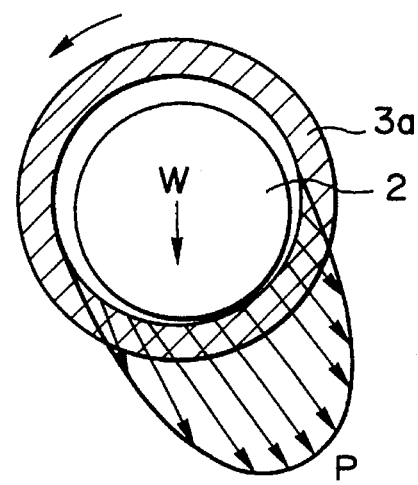
FIG. 18 is a schematic cross-sectional view of a dynamic oil film pressure distribution at the time of rotation of the spindle.

As shown in FIG. 18, since a dynamic oil pressure distribution P is produced because of the rotation of the spindle 2, an oil film is always formed in the narrow gap portion between the spindle 2 and the radial bearing during the rotation, to support the spindle 2 in a contactless manner. The magnetic fluid 31 is circulated in the edge portion of the spindle 2 from the cavity 16 through the connecting path 21 by a centrifugal force in association with the rotation of the spindle 2.

Figure 16:
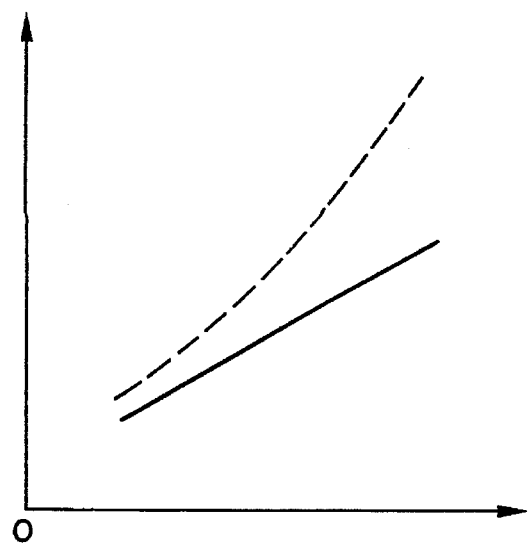
FIG. 16 is graphical illustration of an oil film depicting relationships of the spindle diameter and the rigidity of the oil film and the loss thereof.
Figure 17:
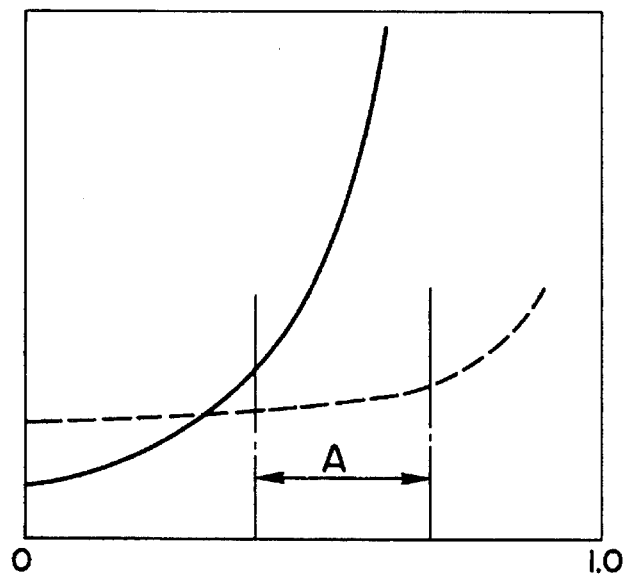
FIG. 17 is a graphical illustration depicting relationship between the eccentricity ratio of the spindle and the rigidity of oil film and the loss thereof.

When the diameter of the spindle 2 is not changed and the spindle 2 is not made eccentric, the spindle 2 rotates concentrically, so that the pressure distribution P relatively decreases. In association with it, the oil film rigidity also decreases, the apparatus is easily influenced by a disturbance, and the vibration increases. Such drawbacks are generally typical in the magnetic disk apparatus which is rotated at a high speed with a light load. When attempts are made to increase the rigidity of the oil film by reducing the gaps between the spindle 2 and the bearings 3a and 3b by enlarging the diameter of the spindle 2 or by reducing the inner diameters of the bearings 3a and 3b, as shown in FIG. 16, the bearing loss increases with an increase in oil film rigidity, so that the temperature of the lubricating oil rises, the lubricating oil deteriorates, and the sealing performance deteriorates thereby resulting in an off-tracking in the magnetic disk due to a thermal deformation. In the present invention, as shown in FIG. 18, an oil film is easily formed by a wedge effect by making the spindle 2 eccentric, the oil film rigidity increases, and a stable rotation can be achieved. In FIG. 17 an eccentricity ratio of "0" denotes a state in which the spindle is not eccentric. The eccentricity ratio of "1" denotes a state in which the spindle 2 is eccentric up to a degree such that the spindle 2 contacts the bearings 3a and 3b.

When the eccentricity ratio is set to a value within a range A (FIG. 17) without being set to an excessive large value, a large oil film rigidity can be obtained without increasing the bearing loss. Since the spindle diameter can be reduced by the formation of the oil film, an activating torque drops and a capacity of the motor can be reduced by an amount of the reduction of the activating torque. Further, even when the apparatus is carried, since pre-loads are applied in the radial and thrust directions, damage of the bearing sliding surface due to the vibration during the transportation can be prevented. Since the motor 10 do not protrude to a lower side of the hub 1, the thickness of magnetic disk apparatus can be suppressed to that of the magnetic disk enclosing section and the apparatus can be reduced in thickness and size. Therefore, when it is assumed that the apparatus is formed in the same thickness as that of the conventional apparatus, the capacity of the magnetic disk apparatus can be increased. That is, according to the present invention, the spindle unit 2 can be miniaturized and the rotating precision can be also improved.

Figure 3:
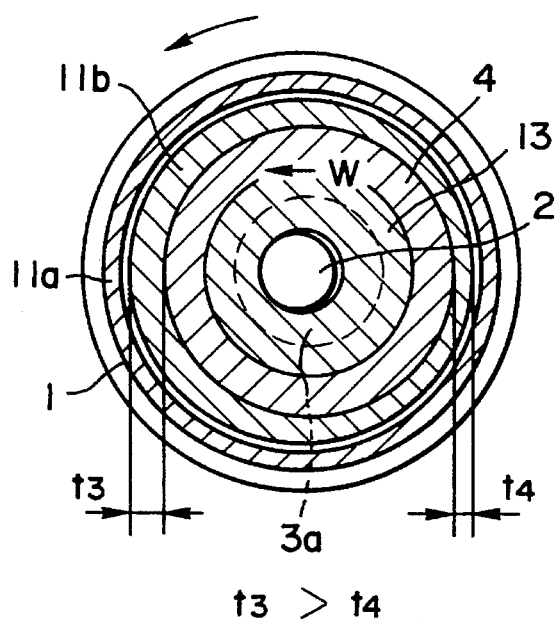
FIG. 3 is a cross sectional view of a magnetic pre-load apparatus according to another embodiment of the invention.
Figure 4:
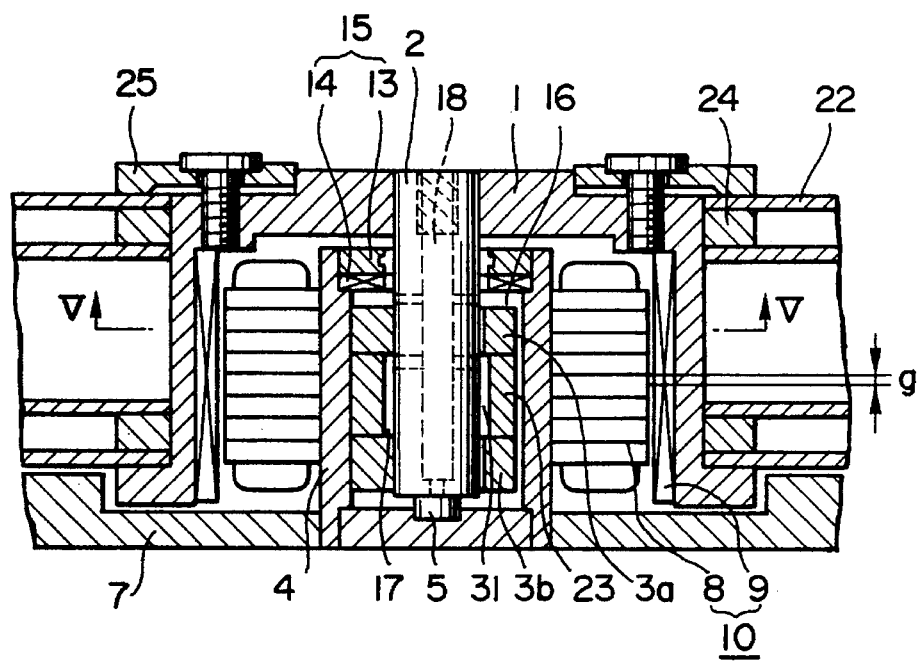
FIG. 4 is a partial cross sectional view of a magnetic disk apparatus according to another embodiment of the invention.
Figure 5:
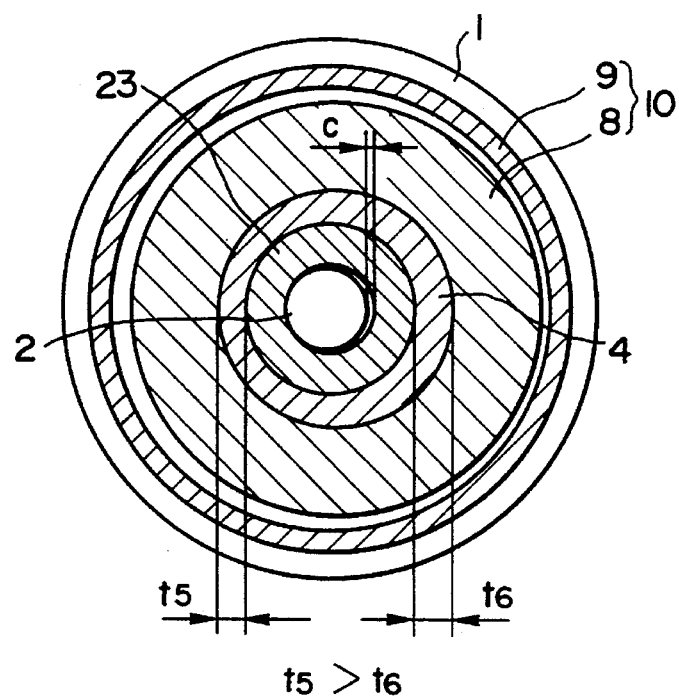
FIG. 5 is a cross sectional view taken along the line V—V in FIG. 4.

In the construction of FIG. 2, the thickness of the permanent magnet has been made uniform. In FIG. 3, however, the thickness of permanent magnet is made uneven ($t_3 > t_4$). The same also shall apply to the magnet 12b. The permanent magnets 11b and 12b are attached concentrically with the radial bearings 3a and 3b. Thus, the spindle 2 is moved due to a repulsive force W between the permanent magnets 11b and 11a and is pressed toward portions of the holes of the radial bearings 3a and 3b. An effect similar to that in case of FIG. 2 can be obtained. In the embodiment of FIGS. 4 and 5, the magnets 11a, 11b, 12a and 12b are omitted and a preload mechanism is provided by the motor 10 itself. Namely, the motor functions not only as a rotating mechanism but also a pre-load mechanism. In FIGS. 4 and 5, the rotor magnet 9 is fixed to the inner surface portion of the hub 1, concentrically with the spindle shaft. As shown in FIG. 5, the outer surface of the bearing housing 4 is worked so as to be eccentric ($t_5 > t_6$) into the radial direction from the centers of the radial bearings 3a and 3b. The stator 8 is provided in the outer surface portion of the bearing housing 4. An eccentricity amount ($t_5 - t_6$) in the radial direction is greater than the maximum gap c between the spindle 2 and the radial bearings 3a and 3b. The spindle 2 is moved in the bearing gap into the eccentricity direction by the magnetic force of the motor 10 and contacts the inner surfaces of the radial bearings 3a and 3b and is applied with a pre-load into a radial direction. As shown in FIG. 4, the rotor magnet 9 is further deviated from the stator 8 only by a distance g in the axial direction of the spindle, thereby also applying a preload into the thrust direction. Thus, since the motor 10 itself has the pre-load mechanisms in both of the radial and thrust directions, the magnets 11a, 11b, 12a and 12b can be omitted. Further, since the flange portion of the bearing housing 4 can be also omitted, the shape can be simplified. On the contrast, a similar effect can be also obtained by setting the stator 8 into a shape which is concentric with the center of the housing 4 and by making the rotor magnet 9 eccentric to the spindle 2. Since the dimension in the axial direction is reduced with a decrease in number of component parts, the motor 10 and the bearing having a high oil film rigidity can be easily arranged to the central portion in the hub 1, the rotating precision can be raised, and the costs can be also decreased. Since the distance between the radial bearings 3a and 3b can be reduced, the magnetic fluid 31 is efficiently circulated and the temperature distribution is uniformed. Thus, the occurrence of an off-track due to a thermal deformation can be reduced.

In each of the above embodiments, the spindle 2 has been arranged in the vertical direction. However, when the spindle 2 is horizontally arranged, an almost similar effect can be obtained.

Figure 6:
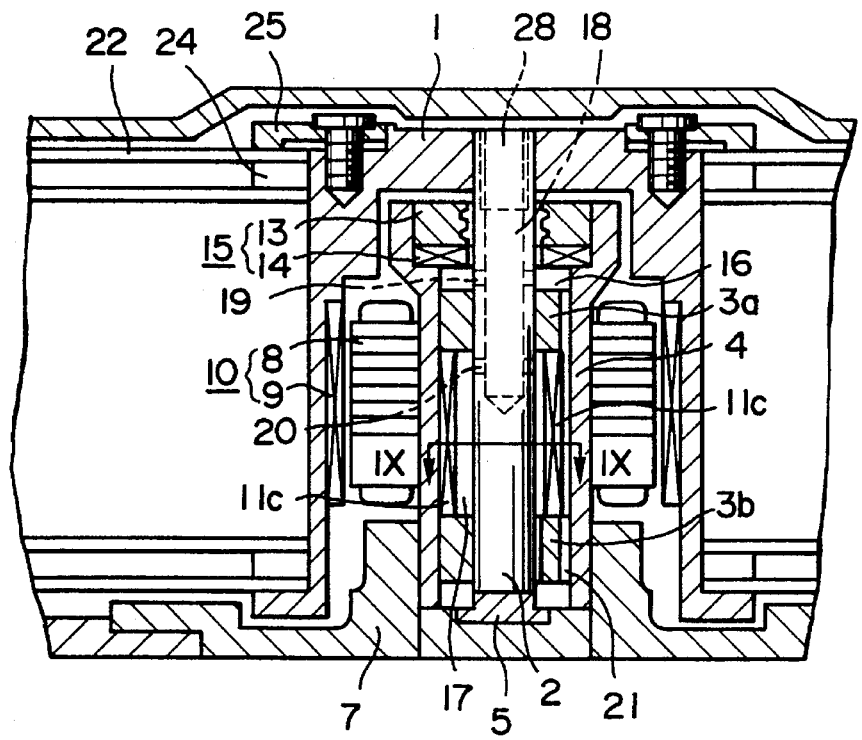
FIG. 6 is a vertical section of view of a spindle unit according to the first embodiment of the invention.
Figure 9:
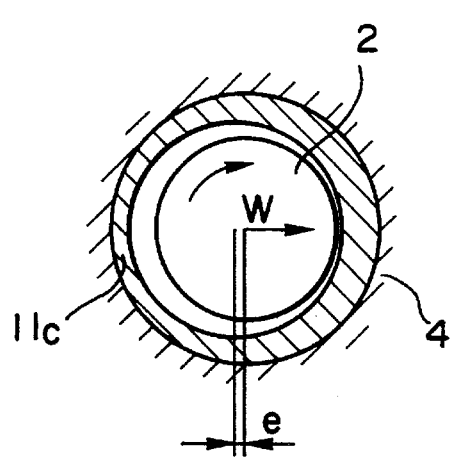
FIG. 9 is a cross sectional view taken along the line IX—IX in FIG. 6.

In the embodiment of FIGS. 6 and 9, a permanent magnet 11c is arranged in a ring-shape between a pair of radial bearings 3a and 3b so as to be eccentric in the radial direction. The spindle 2 is pressed in the radial direction by a magnetic force of the magnet 11c, thereby stabilizing the rotation of the spindle. Therefore, the magnet 11c is fixed in contact with the inner surface of the bearing housing 4. As shown in FIG. 9, the magnet 11c is arranged so as to be eccentrically disposed by an amount e in the radial direction for the spindle 2 that is concentric with respect to the hub 1. Thus, the magnetic force is not uniform. The spindle 2 is pressed toward the inner surfaces of the radial bearings 3a and 3b by the attraction magnetic force by the pre-load mechanism 11 constructed as mentioned above.

Although the magnetic force increases as the eccentricity amount e is large, the gap between the spindle 2 and the radial bearings 3a and 3b is set to be smaller than the minimum gap between the spindle 2 and the ring-shaped permanent magnet 11c and to be less than the gap between the stator 8 and the rotor magnet 9. As shown in FIG. 4, the rotor magnet 9 is arranged so as to be deviated in the axial direction of the spindle 2 from the stator 8 by a predetermined amount, thereby giving a pre-load to the thrust bearing 5.

On the other hand, the axial direction flow path 18 and the radial direction flow paths 19 and 20 are disposed in the spindle 2 and are connected to the cavity 16 and oil chamber 17. The upper end portion of the axial direction flow path 18 is closed by the closing cap 28. Further, the circulating paths 21 are formed in the outer peripheral portions of the radial bearings 3a and 3b and magnet 11c so as to be connected with the cavity 16. The lubricating oil (magnetic fluid 31) is first injected into the oil chamber 17 and then the spindle 2 is subsequently inserted. In this instance, the air in the oil chamber is ejected out through the axial direction flow path 18 and the radial direction flow paths 19 and 20 and the oil chamber is closed by the closing cap 28.

In the sealing mechanism 15 which is constructed by a combination of the screw seal 13 and the magnetic fluid seal 14, the screw seal 13 is provided on the release end side and the magnetic fluid seal 14 is arranged on the inside. The seal 14 is constructed by the ring-shaped permanent magnet 29 having the magnetic pole pieces 30 on both sides as shown in FIG. 1 and is fixed to the bearing housing 4. The inner diameter portion of the magnetic fluid seal 14 approaches the spindle 2 in a contactless manner.

When the spindle 2, to which the magnetic disks 22 are attached, is inserted into the radial bearings 3a and 3b, since there is a gap of a few μmm between the spindle 2 and the radial bearings 3a and 3b, the spindle 2 is pressed to inner portions of the radial bearings 3a and 3b by the magnetic force W and is positioned. A gap is formed on the opposite side.

The gap between the magnet 11c and the spindle 2 is equal to about 100 μm. Even when the spindle 2 is inserted, the inner surface of the magnet 11c and the spindle 2 or the rotor magnet 9 and the stator 8 do not contact each other and are not broken. Therefore, they can be easily disassembled and assembled.

Figure 19:
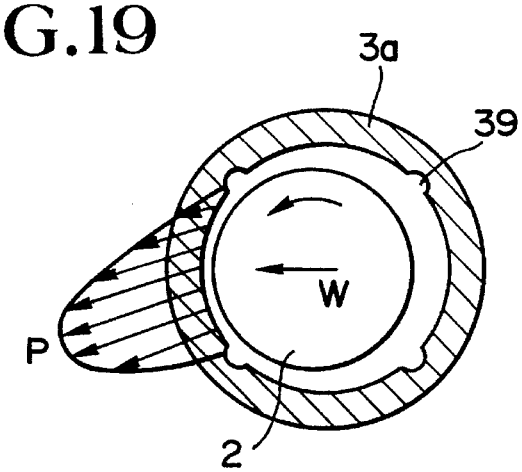
FIG. 19 is a schematic cross-sectional view of a dynamic oil film pressure distribution diagram at the time of the rotation of the spindle.

In the spindle unit, in the stationary mode, the spindle 2 is in contact with the radial bearings 3a and 3b, thrust bearing 5 with proper pre-load forces and oil films are produced on the contact surfaces simultaneously with the activation of the spindle 2. By giving a pre-load, the gap in the radial direction between the spindle 2 and the radial bearings 3a and 3b becomes not uniform. A flow region of the oil is sequentially narrowed toward the contact portion from the maximum gap on the non-pre-load side. Therefore, as shown by an arrow in FIG. 19, the lubricating oil 31, the flow of which is gradually narrowed, increases in pressure in association with the rotation of the spindle 2. The oil film pressure distribution P is generated on the load surfaces of the radial bearings 3a and 3b by such a wedge effect.

Figure 20:
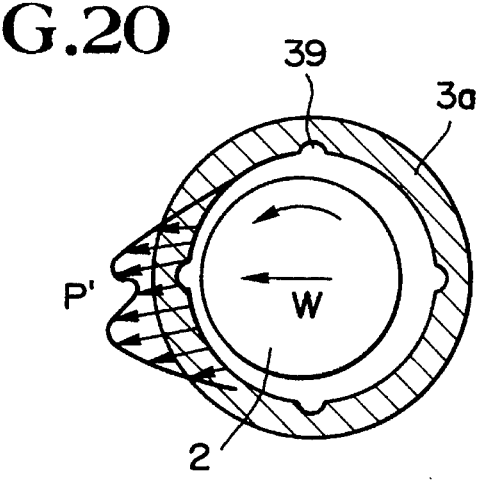
FIG. 20 is a schematic cross-sectional view of an oil film pressure distribution diagram when a pre-load is applied in the direction of an oil groove.

As shown in FIG. 20, when a pre-load is applied in the direction of an oil groove 39, the lubricating oil with the increased pressure escapes along the oil groove 39. Therefore, the oil film pressure distribution decreases as shown by P' and it is improper.

Since a fluid path shape wherein the oil film can be easily formed by a proper pre-load can be constructed, the spindle 2 is always stably supported in a contactless manner.

Further, the magnetic fluid 31 passes from the cavity 16 through the connecting path 21 and is connected with the shaft edge portion of the spindle 2 and the circulating operation is executed by the centrifugal force in association with the rotation of the spindle 2.

Figure 10:
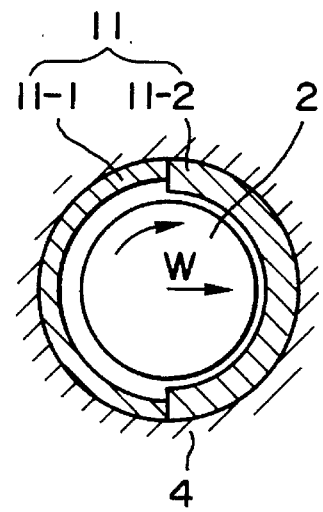
FIG. 10 is a cross sectional view of a magnetic pre-load mechanism of the invention.

In FIG. 9, although the inner diameter surface of the ring-shaped permanent magnet 11c has been worked so as to be eccentric, the permanent magnet provided between the radial bearings 3a and 3b is divided into two magnets in the modification. Inner diameters of two half-ring-shaped magnets 11-1 and 11-2 (FIG. 10) are different. Thus, the spindle 2 is moved in the bearing gap into the direction shown by an arrow by the difference W of the magnetic forces of the left and right half-ring-shaped permanent magnets 11-1 and 11-2 which face the spindle 2. The spindle is pressed to the portions of the inner surfaces of the radial bearings 3a and 3b, so that an effect similar to that in the case of FIG. 9 can be obtained. The above example can be also applied to a magnetic preload mechanism in the embodiment shown in FIG. 1.

Figure 8:
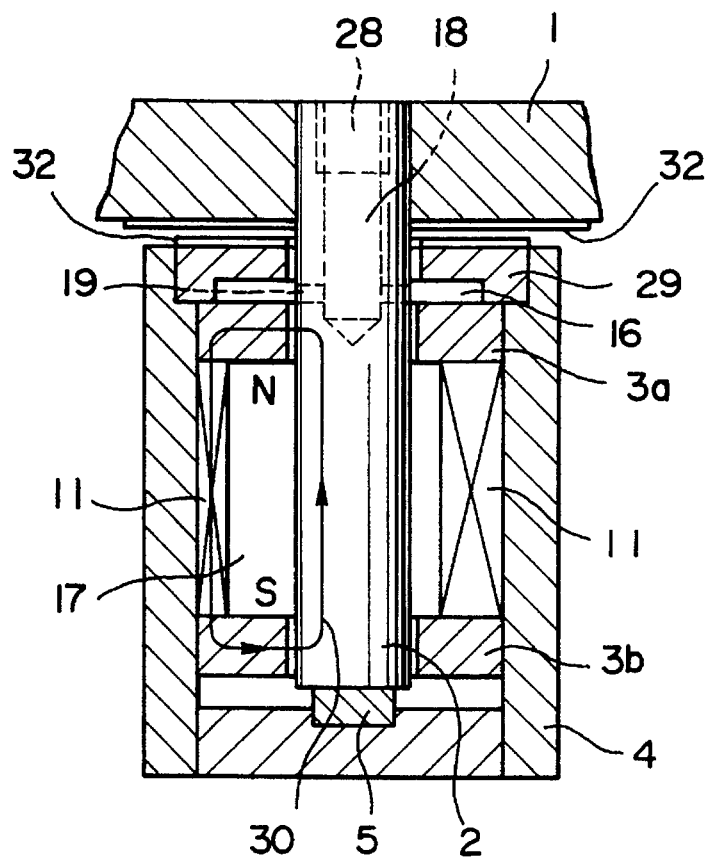
FIG. 8 is an enlarged cross sectional view of a bearing apparatus according to the third embodiment of the invention.

The modification of FIG. 8 differs from the above described embodiments in that the eccentric ring-shaped permanent magnet 11 has N pole and S pole formed in the spindle axial direction. The spindle 2 and the radial bearings 3a and 3b which are arranged in both end portions of the magnet 11 are made of a magnetic substance. The bearing housing 4 which fixedly holds them is made of a non-magnetic substance. An oil cover 29 having the cavity 16 is provided as a sealing mechanism on the release end side of the bearing housing 4. In the above construction, as shown by an arrow in FIG. 8, a magnetic force line 30 from the S pole of a permanent magnet 11 to the N pole of the permanent magnet 11 through the radial bearing 3b, spindle 2, and radial bearing 3a is generated and a magnetic circuit is formed. Therefore, the portions of the radial bearings 3a and 3b promote the radial pre-load.

Further, an oil repellent 32 is coated onto one or both of the surfaces of the oil cover 29, the hub 1 which faces the oil cover, or the surface of the spindle 2. Therefore, even when the magnetic fluid is scattered by the centrifugal force upon activation of the spindle 2 or the oil temperature rises so that the magnetic fluid 31 is expanded, the magnetic fluid is collected into the chamber 16 of the oil cover 29. Then, the oil is repelled by the oil repellent 32 of an extremely small surface tension, so that the magnetic fluid passes along the flow path 19 and is absorbed into the flow path 18. Therefore, the oil doesn't leak to the outside. As mentioned above, in the example, since the radial bearings 3a and 3b themselves have the sealing function, the sealing device can be omitted. Therefore, it is effective for miniaturization of the spindle unit.

According to the invention as mentioned above, since the motor 10 is provided in the hub 1, the magnetic disk apparatus can be miniaturized.

On the other hand, by the radial pre-load mechanism using the ring-shaped permanent magnet which was worked so as to be eccentric in the radial direction between the pair of radial bearings, the spindle is pressed toward portions of the surfaces of the radial bearings, the shaft oscillation is reduced, and the rotating precision can be improved. Furthermore, since the pair of radial bearings arranged in both edge portions of the permanent magnet are made of the magnetic substance and the magnetic circuit is formed, the lubricating oil sealed in the bearing housing 4 is held at the sliding surfaces of the radial bearings. Thus, the magnetic circuit performs both of the lubricating function and the sealing effect. Therefore, the stable lubricating operation can be obtained without leaking the lubricating oil to the outside.

In each of the above embodiments, although the spindle unit has been arranged in the vertical direction, an almost similar effect can be obtained by horizontally arranging the spindle unit.

The sealing mechanism 15 includes a pole piece 33 which is fixed to the spindle 2 by inserting it with a pressure or by adhering, a magnet 35 fixed to a magnet housing portion in the upper edge portion of the bearing housing 4, a cover ring 34 attached to the upper edge of the magnet 35, and a magnetic fluid 40. Among those component parts, the pole piece 33 is made of a magnetic substance. Each of the magnet housing and the cover ring 34 is made of a non-magnetic substance. The magnet 35 is arranged at a position which faces the pole piece 33 and an N pole and an S pole are formed in the axial direction. Therefore, a magnetic circuit is formed between the pole piece 33 and the magnet 35 as shown by an alternate long and one short dash line. The magnetic fluid 40 is held in the sealing gap between the pole piece 33 and the permanent magnet 35, thereby maintaining the function as a sealing device.

Figure 14:
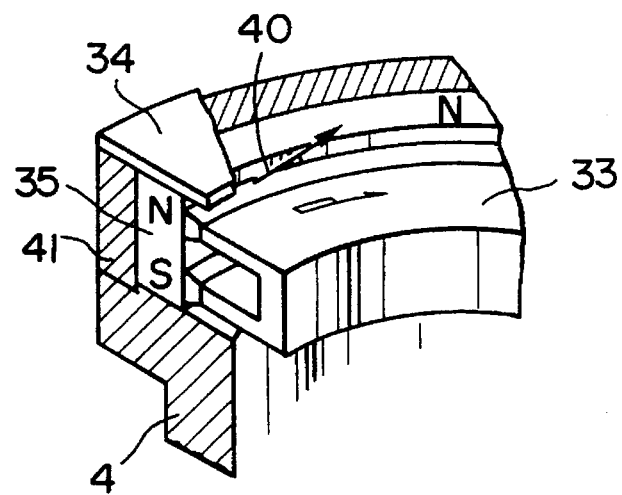
FIG. 14 is a schematic cross-sectional detail view depicting an effect of the invention.

As shown in FIG. 14, the pole piece 33 starts to rotate at a high speed, and when the centrifugal force is larger than the holding force of the magnetic fluid 40, the magnetic fluid is scattered in the tangential direction of the outer diameter portion of the pole piece 33 as shown by an arrow in the diagram. In this instance, since the magnetic poles of the magnet 35 exists in the scattering direction of the magnetic fluid 40 in the sealing mechanism according to the invention, the magnetic fluid is captured by the magnet 35. Moreover, since the cover ring 34 made of the non-magnetic substance is arranged on the upper edge surface of the magnet and the inner diameter of the cover ring 34 is smaller than the outer diameter of the pole piece 33, the scattered magnetic fluid is certainly collected to the magnet 35.

Figure 11:
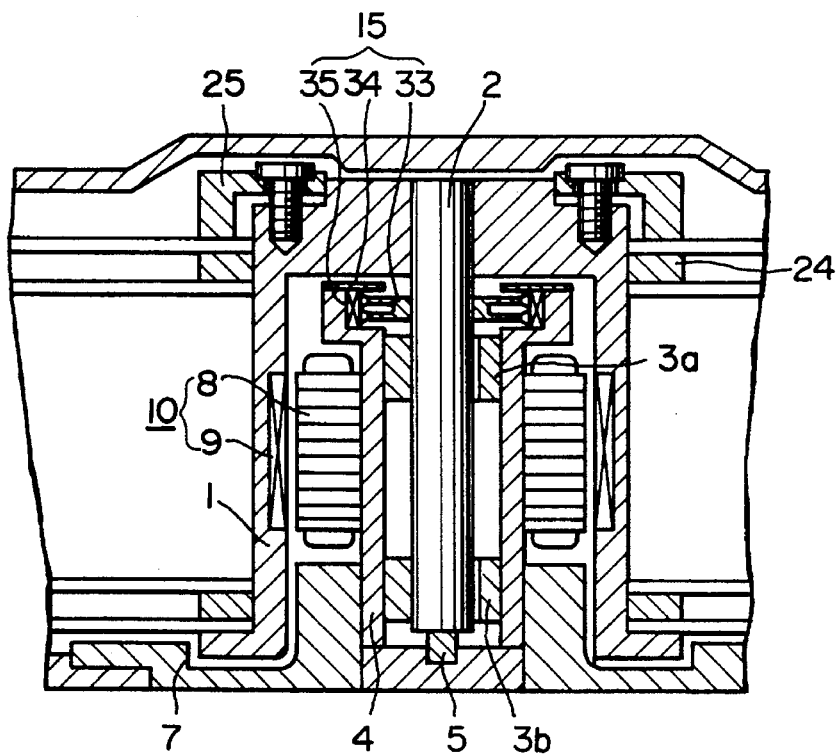
FIG. 11 is a cross sectional view of a spindle unit according to another embodiment of the invention.
Figure 12:
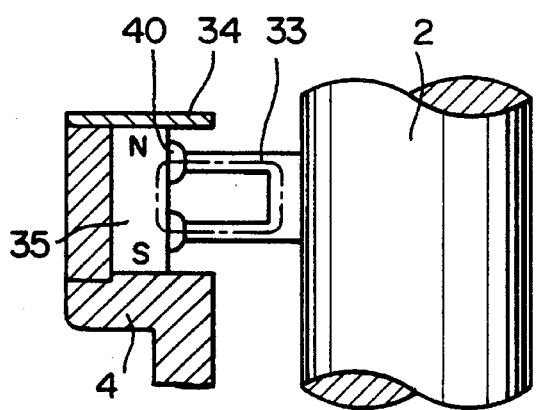
FIG. 12 is a partial cross sectional view showing enlargedly a sealing mechanism in FIG. 11.
Figure 13:
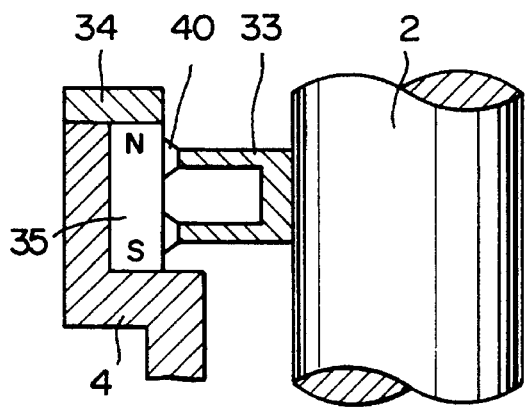
FIG. 13 is a vertical sectional view of a spindle unit according to another modification of the invention.
Figure 15:
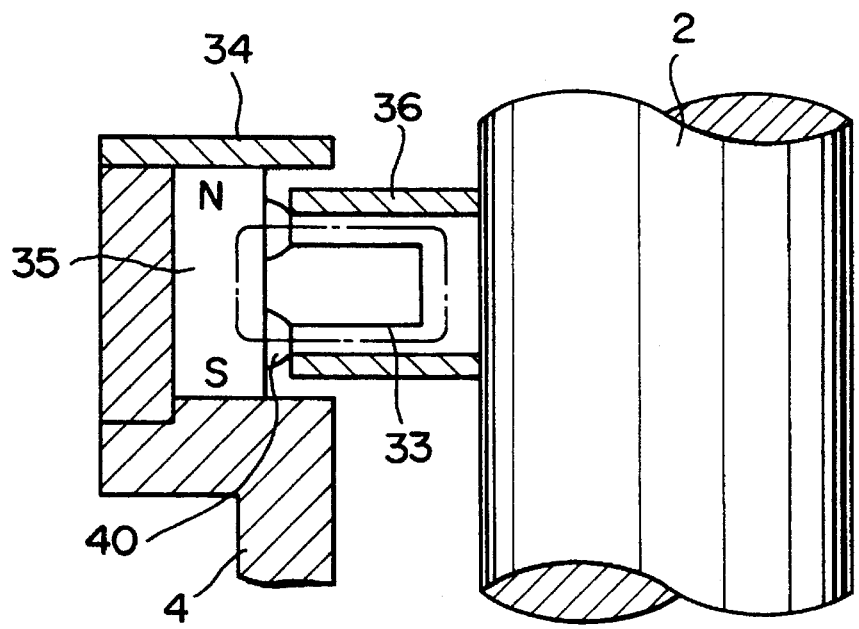
FIG. 15 is a partial sectional view showing another modification of the invention.

There is a case where the spindle unit is vibrated during the transportation or the like and there is a possibility such that the magnetic fluid flows due to the vibration. In this case, the pole piece 33 is made of the magnetic substance and the magnetic circuit is contructed, so that the magnetic fluid is adhered to the side surface of the pole piece 33. When the spindle starts to rotate, there is a case where the magnetic fluid is scattered by the centrifugal force. To solve such a problem, as shown in FIG. 15, magnetism shielding rings 36 made of a non-magnetic material are fixed to both end surfaces of the pole piece 33 by adhering or the like. Due to this, since no magnetic circuit is formed on the side surface of the pole piece 33, the magnetic fluid 40 does not adhere to the side surface of the pole piece 33. Consequently, an outflow of the magnetic fluid due to the vibration or the like upon transportation can be also prevented. FIG. 13 provides a construction substantially similar to the example of FIG. 11 except that the inner diameter of the cover ring 34 is almost equal to the inner diameter of the magnet 35. After the bearings 3a and 3b and sealing mechanism 15 are built in the spindle 2, the hub 1 must be inserted with a pressure in the above example. According to the embodiment, of FIG. 13 after the hub 1 was inserted into the spindle 2 with a pressure, the hub 1 can be assembled to the bearing housing 4, so that an assembling efficiency and a working precision are improved. In the embodiment of FIG. 13, since the cover ring 34 and the magnet 35 have almost the same inner diameters, a holding force for the scattering in the axial direction slightly deteriorates. Therefore, it is necessary to form the cover ring thicker than that in FIG. 11. In the example of FIG. 12 as well, an effect similar to that in FIG. 13 is obtained by forming the cover ring 34 by an elastic material such as rubber or the like.

According to the invention, by arranging the magnets to the pole piece attached to the spindle and at the position which faces the pole piece on the stationary side, even when the magnetic fluid is scattered by the centrifugal force at the time of the high-speed rotation, since there is a magnetic pole of a high magnetic flux density in the scattering direction, the magnetic fluid is immediately captured and is recovered into an original state. Therefore, the disk is not polluted and the sealing function is always maintained, so that a magnetic disk apparatus having a high assembling efficiency can be provided.

What is claimed is:

1. A spindle unit comprising:

a hub having a spindle;

a bearing housing into which said spindle is inserted;

a pair of ring-shaped radial sliding bearings separated from each other in a thrust direction and provided at inner surface portions of said bearing housing, for supporting said spindle in a radial direction, said spindle penetrating said pair of ring-shaped radial bearings;

a sealing mechanism including a magnetic fluid seal and screw seal, said magnetic fluid seal is fitted at an inner surface portion of said bearing housing to have a cavity formed between a surface of one of said radial bearings and a surface of said magnetic fluid seal, and said screw seal is fitted on said magnetic fluid seal such that a magnetic fluid injected into said bearing housing is prevented from scattering to an outside of said bearing housing;

a rotating mechanism for rotating said spindle;

a thrust sliding bearing provided at a bottom portion of said bearing housing for supporting said spindle in the thrust direction; and a pre-load mechanism including at least one pair of ring-shaped magnets with a first ring-shaped magnet being provided at an outer upper portion of said bearing housing and a second ring-shaped magnet being provided at an inner upper portion of said hub such that said first ring-shaped magnet is provided at a shifted position with respect to said second ring-shaped magnet in the thrust direction for preloading said spindle with respect to at least the thrust direction, said second ring-shaped magnet substantially faces said first ring-shaped magnet in the radial direction, a third ring-shaped magnet provided at an outer lower portion of said bearing housing and a fourth ring-shaped magnet provided at the inner lower portion of said hub such that said fourth ring-shaped magnet substantially faces said third ring-shaped magnet in the radial direction, a pre-loading means for pre-loading said spindle to said inner surface portions of said pair of ring-shaped bearings by radial direction components of a first interaction between said first and second ring-shaped magnets and a second interaction between said third and fourth ring-shaped magnets, wherein magnitudes of the radial direction components of said first and second interactions are isometric with respect to a center of said radial bearings before the pre-loading and are maximum in the same radial direction.

2. A spindle unit according to claim 1, further comprising a thrust sliding bearing provided at a bottom portion of the bearing housing, for supporting said spindle in a thrust direction, and wherein said pre-load mechanism further comprises a thrust direction pre-load mechanism for pressing said spindle to said thrust bearing.

3. A spindle unit according to claim 1, wherein said preloading mechanism further comprises:

a thrust direction pre-load mechanism for preloading said spindle to said thrust bearing by thrust direction components of said first and second interactions, said first and third ring-shaped magnets being arranged as such that they are deviated by only predetermined distances from said second and fourth ring-shaped magnets in the thrust direction, respectively.

4. A spindle unit comprising:

a bearing housing having a pair of ring-shaped radial bearings provided apart from each other and fixed on inner surface portions of said bearing housing;

a hub having a spindle which penetrates said radial bearings and is supported in a radial direction by said radial bearings;

a sealing mechanism including a magnetic fluid seal and a screw seal, said magnetic fluid seal is fitted at an inner surface portion of said bearing housing to have a cavity formed between a surface of one of said radial bearings and a surface of said magnetic fluid seal, and said screw seal is fitted on said magnetic fluid seal such that a magnetic fluid injected into said bearing housing is prevented from scattering to an outside of said bearing housing;

a rotary magnet provided in an inner surface portion of said hub;

a stator coil provided in an outer surface portion of said bearing housing and substantially facing said rotor magnet, said spindle being rotated by an interaction force between said rotor magnet and said stator coil and a minimum distance between said rotor magnet and said stator coil being larger than a maximum distance between said spindle and said radial bearings;

a thrust sliding bearing provided at a bottom portion of said bearing housing for supporting said spindle in the thrust direction; and a pre-load mechanism including a pair of ring-shaped magnets with a first ring-shaped magnet being provided at an outer upper portion of said bearing housing and a second ring-shaped magnet being provided at an inner upper portion of said hub such that said first ring-shaped magnet is provided at a shifted position with respect to said second ring-shaped magnet in the thrust direction for magnetically pre-loading said spindle to inner surface portions of said radial bearings through a film of magnetic lubricating oil such that an oil film rigidity is increased without substantially increasing a bearing loss, as compared with those in a case where the spindle is not pressed, said second ring-shaped magnet is provided at the inner upper portion of said hub such that the second ring-shaped magnet substantially faces said first ring-shaped magnet in the radial direction, a third ring-shaped magnet provided at an outer lower portion of said bearing housing and a fourth ring-shaped magnet provided at the inner lower portion of said hub such that said fourth ring-shaped magnet substantially faces said third ring-shaped magnet in the radial direction, pre-loading means for pre-loading said spindle to said inner surface portions of said pair of ring-shaped bearings by radial direction components of a first interaction between said first and second ring-shaped magnets and a second interaction between said third and fourth ring-shaped magnets, wherein magnitudes of the radial direction components of said first and second interactions are isometric with respect to a center of said radial bearings before the pre-loading and are maximum in the same radial direction.

* * * * *